United States Patent [19]
Crofford

[11] 3,835,383
[45] Sept. 10, 1974

[54] DATA PULSE WIDTH MEASUREMENT CIRCUIT

[75] Inventor: Tommy R. Crofford, Tulsa, Okla.

[73] Assignee: Telex Computer Products, Inc., Tulsa, Okla.

[22] Filed: Sept. 24, 1973

[21] Appl. No.: 400,394

[52] U.S. Cl. ............................. 324/186, 328/129
[51] Int. Cl. ...................... G04f 11/06, G04f 11/12
[58] Field of Search.................... 324/186, 183, 188; 328/130, 129

[56] References Cited
UNITED STATES PATENTS

| | | | |
|---|---|---|---|
| 2,985,828 | 5/1961 | Mason | 324/186 |
| 3,258,764 | 6/1966 | Muniz et al. | 324/186 |
| 3,404,345 | 10/1968 | Marx et al. | 328/130 |

*Primary Examiner*—Alfred E. Smith
*Attorney, Agent, or Firm*—Head & Johnson

[57] ABSTRACT

This abstract describes a system by means of which the duration of each pulse in a selected series of pulses which can be repetitively and synchronously generated, can be measured. A signal is provided at the start of each repetition of the series or train of pulses, a variable time delay means responsive to this initiating pulse generates a cursor pulse which can be positioned in time coincidence with any one of the pulses in the pulse train. Means are provided for generating pulses at each data transition and means are provided for the first transition pulse following the cursor pulse to start a pulse counter and means responsive to the next succeeding transition pulse to stop the counter. The counter reading is therefore a precise measure of the time duration of the pulse.

The timing pulse which is coincident with the start of the pulse train can be carried to an oscilloscope which displays also the cursor pulse to indicate which of the pulses in the train is being measured at the time.

6 Claims, 3 Drawing Figures

3,835,383

DATA PULSE WIDTH MEASUREMENT CIRCUIT

BACKGROUND OF THE INVENTION

This invention lies in the field of pulse width measurement. More specifically, it is in the field of the measurement of a specific pulse in a repetitive train of pulses.

This device is useful for the purpose of determining the operating characteristics of magnetic digital tape recording heads. To do this, it has been conventional in the prior art to display on an oscilloscope a repetitive series of pulses recorded on a tape by a given magnetic recording head and read from the same tape by the same head. Knowing precisely what the signal was that was delivered to the head in the recording operation, and observing the pulse train as read from the tape, by the same head, any difference in timing between the pulse transitions on the input pulse and the output pulses can be determined. However, the precision of measurement of time by means of an oscilloscope trace is not very precise and therefore a more precise time measurement system such as that of this invention is required for precise determination of the recording and reading characteristics of magnetic heads.

SUMMARY OF THE INVENTION

It is a primary object of this invention to provide an apparatus which includes a pulse counter and clock. The counter is set at a first selected transition of the pulse train and is stopped at the next succeeding transition of the pulse train. The starting and stopping can be adjusted to any one of the transitions in the whole train of pulses.

The apparatus of this invention comprises means for initiating a time delay between the start of the data pulse train and the occurrence of a selected data pulse, the pulse being selected is indicated by means of a cursor on an oscilloscope, the cursor being delayed to indicate which transition is to be the first one and which the second one of the time interval determining generates a voltage which starts the counter and the next data transition generates a pulse which stops the counter. The actual count of the counter is a precise measure of the width of the selected pulse.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
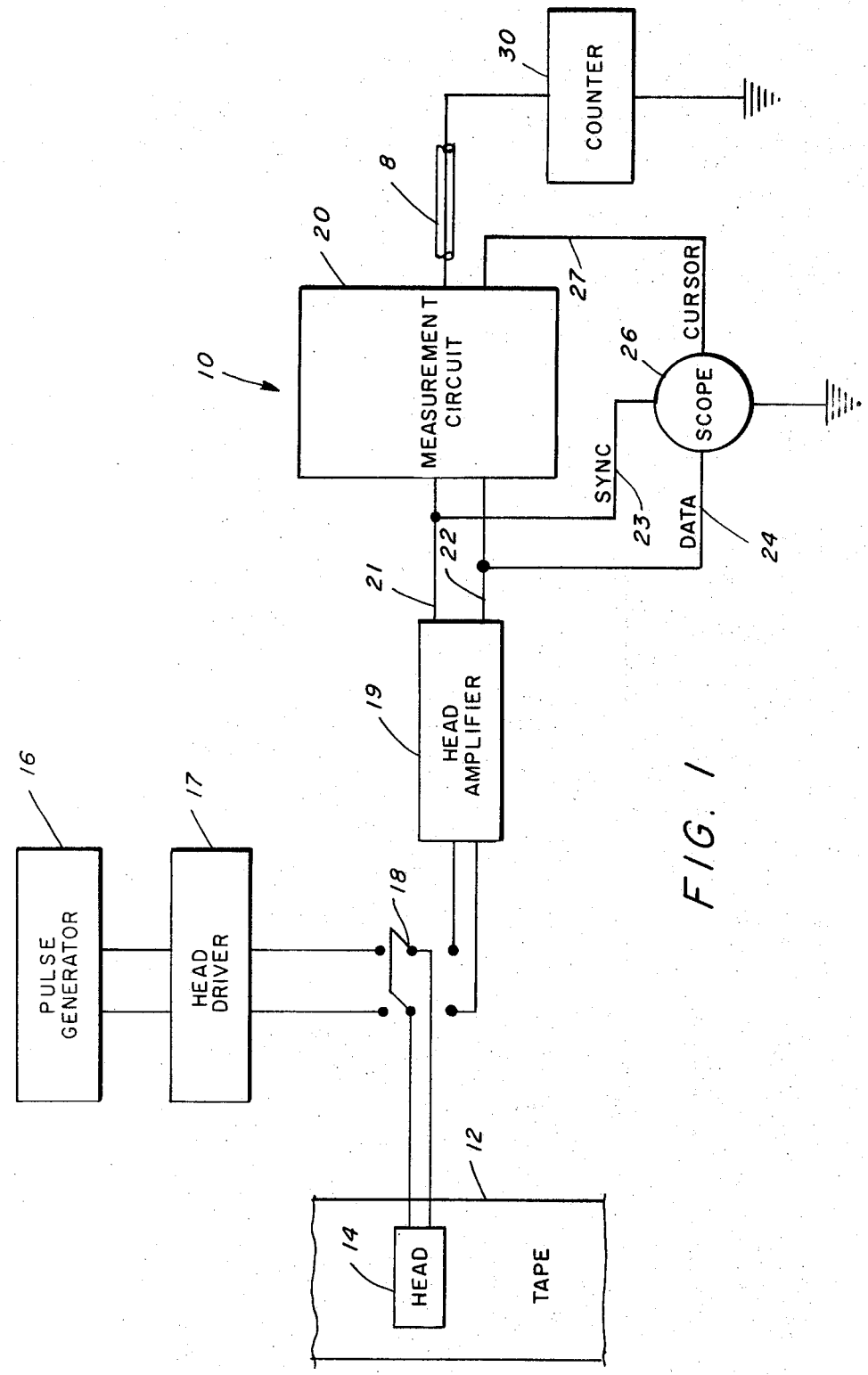
FIG. 1 indicates the system for studying the recording and reading characteristics of a magnetic digital recording head.

Referring now to the drawings and in particular to FIG. 1 there is shown a diagram of a system for testing magnetic digital recording heads. There is a magnetic tape indicated by numeral 12 and a magnetic head 14. A pulse generator 16 can generate a series of square wave pulses. These pulses are started on signal and are programmed so that they can be repeated time and again. The pulses from the pulse generator 16 go to a driver amplifier 17 to drive the magnetic head 14 through switch 18. As the tape 12 moves there is recorded thereon a plurality of pulse trains all identical and consecutively spaced along the tape. After the tape is recorded it is rewound and then passes back under the head 14 with the switch 18 thrown to connect the head output to a head amplifier 19 and then to the measuring circuit (lead 86 and 35) of this invention indicated generally by numeral 10. There are two signals presented from the head amplifier, a first is a synchronizing or initiating signal which goes by way of line 21 to the measuring circuit, and by line 23 to an oscilloscope (or scope) 26, for convenience. Also, the data pulse train goes by lead 22 to the measuring circuit 20 and also by lead 24 to the scope. There are two outputs of the measuring circuit 20, one goes by lead 8 to a pulse counter 30 and the other is a cursor signal output 27 which goes to the scope. The box 20 labeled measurement circuit of FIG. 1 is shown in schematic diagram in FIG. 2 which will now be described.

Figure 2:
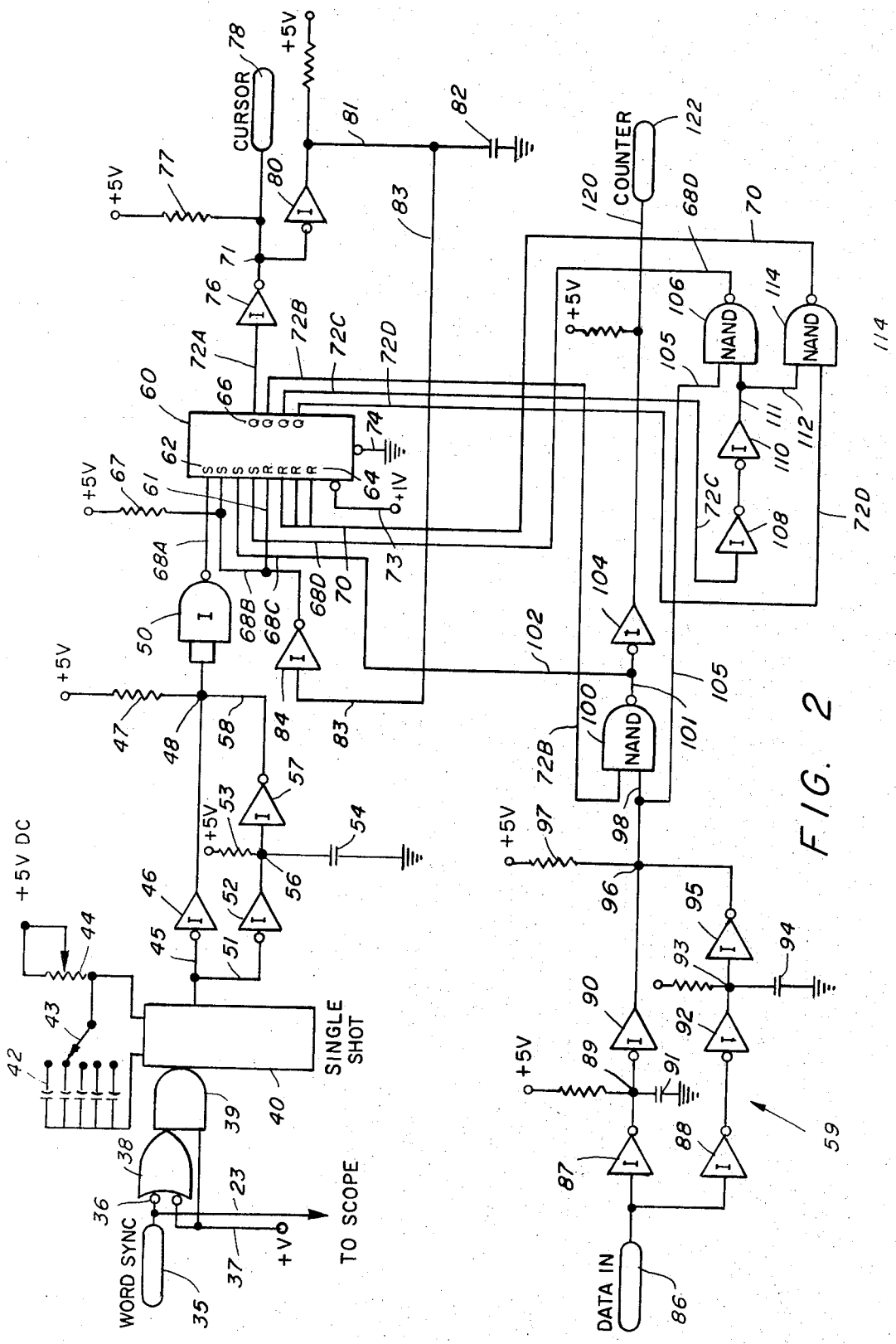
FIG. 2 is a schematic diagram of the circuit of the instrument of this invention.
Figure 3:
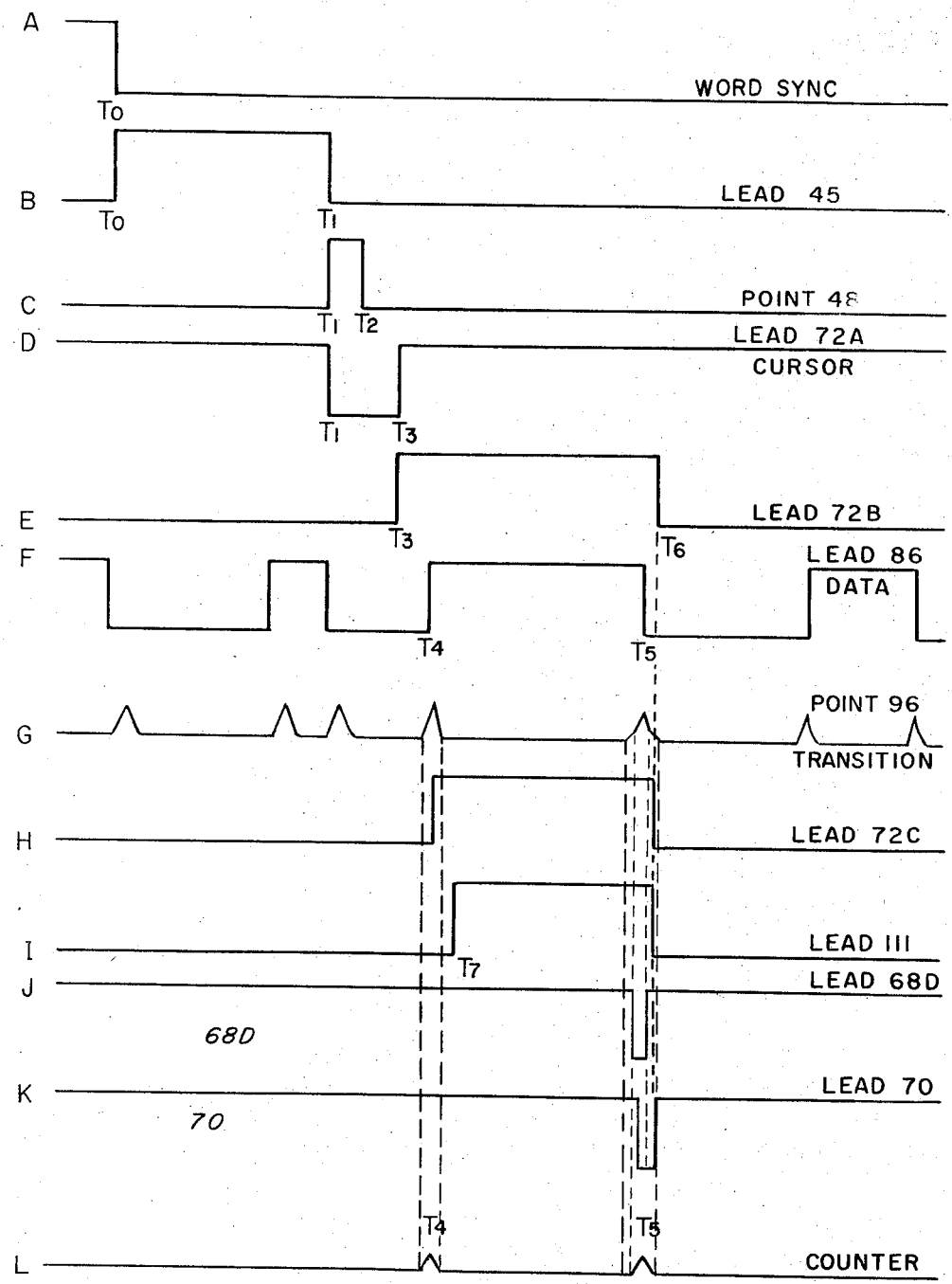
FIG. 3 is a series of time traces useful in explaining the operation of the circuit of FIG. 2.

Referring now to FIG. 2, the word sync terminal, numeral 35, is the point that receives the pulse which indicates the start of the pulse train. This goes by lead 23 to the scope 26. It also goes through the gate 38 and gate 39. A negative pulse on terminal 36 will put a positive pulse into the input of the single shot monostable multivibrator 40. This single shot 40 is simply a time delay means, the timing of which is determined by the combination of capacitor 42 selected by switch 43 and the value of resistance 44 connected to the 5 volts positive voltage terminal. With the arrival of a word sync pulse, the output lead 45 from the single shot becomes positive and at the end of a selected delay it drops back to zero. In FIG. 3 trace A indicates the sync word signal which at a time TO drops from a positive to zero value. Trace B indicates the output voltage on lead 45 of the single shot which at the same time rises from zero to a positive value, and after a time duration to $T_1$ which is set by the R-C network 42, 44, it again returns to zero. When the single shot resets itself and the voltage of trace B drops to zero at $T_1$, a pulse is generated at point 48 indicated on trace C. This pulse goes positive for a short interval of time from $T_1$ to $T_2$ and during this time it sets the first of four flip-flops, or latches, which are included in the box 60. When the first latch is set by the voltage at 48 through the inverter 50 and lead 68A, a positive voltage appears at output terminal 66 on lead 72A, which goes to inverter 76 to the cursor output 78. The voltage on the cursor is indicated on trace D. This voltage goes negative at time $T_1$ and lasts to a time $T_3$, which is later than the time $T_2$ of the pulse at point 48. As soon as the voltage at point 71 drops to a negative value at $T_1$ there is a signal applied by leads 81, 83 to inverter 84, the output of which goes by lead 68B to set the second latch, or flip-flop, in the box 60. There is a selected delay between the time $T_1$ that the voltage drops to zero and the time $T_3$ when the second latch is set. Simultaneously, by means of lead 61 the first latch is reset. Thereafter voltage is removed from the cursor lead output 78, and only the second latch is set. The Q output from the second latch goes by lead 72B as a positive voltage, to NAND gate 100. This positive voltage enables the NAND gate 100, and permits it to pass any positive voltage on the other input lead 98. In other words, as soon as the cursor pulse on trace D returns to zero the positive voltage on lead 72B indicated on trace E becomes positive at $T_3$ and continues to a later time $T_6$ which will be discussed below. At this time gate 100 is enabled so that any positive voltage coming in on lead 98 will pass through.

Consider now the Data-In terminal 86. It goes to a network indicated generally by the numeral 59 which is called a transition detector. The purpose of this network is to generate a series of sharp pulses as shown on trace G of FIG. 3, whenever there is a transition from a plus to a zero, or from a zero to a plus voltage on the data train of trace F. The pulses on trace G are exaggerated in their time width, and they are extremely sharp pulses which determine precisely the time of occurrence of the transitions indicated on the trace F.

The pulses that are generated in the transition detector 59 are generated by means of two parallel paths, one of them through a series of two inverters 87 and 90 with a resistance connected to a positive five volts and a capacitance 91 connected to ground, tied together at the junction 89 of the two inverters. There is a second path in parallel with the two inverters 87, 90 which utilizes three inverters 88, 92 and 95. There is a corresponding resistance 93 and a capacitance 94 joined at the junction of the two inverters 92 and 95.

Consider the network 59. It comprises two parallel paths from terminal 86 to junction 96. One path comprises inverters 87, 90 with the R-C network at junction 89. The second path comprises a similar pair of inverters 92, 95 and R-C network at junction 93. However, this second path has the additional inverter 88. When the potential on 86 is constant, either +5V or zero, then the R-C networks are inactive. Consider 86 is positive potential, then 89 is zero and the output of 90 is positive. At the same time the output of 88 is zero, and 93 is positive and the output of 95 is zero. The negative of the output of 95 controls the potential at 96 even though the output of 90 is positive. If 86 is zero potential, then a similar condition exists, except the output of 90 is zero and the output of 95 is positive, and 96 is zero.

There is only one short instant of time when the condition at 96 is different. Consider 86 zero, 89 is positive. When 86 goes positive, the output of 87 becomes low impedance, the capacitors 91 discharges through 87 to ground very quickly. Then when 86 again goes zero the potential at 89 tries to rise rapidly, but is held back by the charging of capacitance 91. So there is a short interval when both inverters 90, 95 have a positive output, then when 89 builds up to a high enough potential the output of 90 goes zero, and 96 goes zero again. The same action happens on the reverse transition, except the roles of the two paths are interchanged.

Thus, the circuit indicated generally by the numeral 59 has an output at point 96 which is the series of pulses shown on trace G, one for each transition of the data trace F. It has been indicated that trace E indicates the potential on lead 72B which enables the NAND gate 100 to pass positive signals on lead 98 so that the first transition pulse occurring after $T_3$, namely the pulse at $T_4$, will pass through the NAND gate 100 and provide a signal on lead 102. This signal will set the third flip-flop, or latch, in the box 60. Also, that signal goes through the inverter 104 and out on lead 120 to the counter 122. The counter is a conventional, on the shelf item, which includes an internal clock and a means of starting and stopping the count. The signal on lead 120 is sufficient to start the counter and a second signal on the same lead will stop the counter. So the counter starts with the pulse passing through the NAND gate 100 at time $T_4$.

The pulse on lead 102 has set the third latch and so the Q output of that third latch on lead 72C shown on trace H, becomes positive and through the short delay of the two series inverters 108 and 110 places a positive voltage on lead 111 shown on trace I, to enable the NAND gate 106. The NAND gate 106 now is enabled so that the next time a positive pulse comes on lead 98, it will go by means of lead 105 through the NAND gate 106 and lead 68D, shown on trace J, and set the fourth latch in the box 60. The next transition pulse that can do that, will be the second pulse at $T_5$ the NAND gate 106 passes the pulse on lead 68D, shown on trace J which sets the fourth latch, and places a positive voltage on lead 72D, which goes to the NAND gate 114, which has also been enabled by the voltage on lead 111. Being enabled, a negative voltage is formed on the output of the NAND gate 114 which goes by lead 70 shown on trace K, to reset the second, third and fourth latches. This removes positive voltage from lead 72B to disable the NAND gate 100. It also removes positive voltage from lead 72C which brings to zero the positive voltage on trace I of FIG. 3 and disables the NAND gates 114 and 106. The important thing is that the NAND gate 100 is disabled and therefore after the second transition pulse has passed through, no further pulses will pass through NAND gate 100, and therefore the counter 122 which has been counting from $T_4$ to $T_5$ will count no more and the total count is a measure of the time duration between the two transitions $T_4$ and $T_5$, and therefore a measure of the width of the pulse between $T_4$ and $T_5$. The counter interval is shown on trace L.

The pulse output of NAND gate 106 which goes by lead 68D to set the fourth latch is shown on trace J and the voltage on lead 72D which goes to the NAND gate 114 the output of which is shown on trace K is the pulse which resets the second, third and fourth latches. The trace E indicates the time at which the NAND gate 100 is enabled which starts at $T_3$ and ends at $T_6$ the time that the latches 2, 3, and 4 are reset and all power is removed from the counter. The lowermost trace L indicates by the two peaks labeled $T_4$ and $T_5$ the times at which the counter is started and stopped and indicates the time that is counted.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A system for measuring the width of a selected pulse in a repetitive series of pulses, comprising:
    a. means responsive to the start of said series of pulses for initiating a first timing pulse of selected adjustable time duration;
    b. means responsive to the end of said first timing pulse for generating a cursor pulse;

c. means responsive to said cursor pulse and a selected delay for enabling a counter gate;
d. data pulse transition detector means for generating a sharp pulse at each data transition;
e. means responsive to said transition detector means, and said enabled counter gate to start a pulse counter; and
f. means responsive to the next successive pulse output from said transition detector to stop said counter, and to disable said counter gate.

2. The system as in claim 1 in which said means for generating said first timing pulse comprises one shot monostable multivibrator means including resistor-capacitor means to adjust the time delay of said one shot.

3. The system as in claim 1 in which said means for generating a cursor pulse comprises polarized delay means responsive to said one shot for setting a first flip-flop, and delay means on the output of said first flip-flop for resetting said first flip-flop.

4. The system as in claim 1 in which said means to enable said counter gate comprises second flip-flop means set by said delay means on the output of said first flip-flop.

5. The system as in claim 1 in which said transition detector comprises:

a. a series of two inverters connected between the data pulse input and said enabling counter gate, an R-C network connected to the junction between the two inverters;
b. a series of three inverters connected in parallel with said series of two inverters;
c. an R-C network connected at the junction between the second and third inverter.

6. A system for measuring the width of a selected pulse in a repetitive series of pulses, comprising:

a. means responsive to the start of said repetitive series of pulses and a selected adjustable time delay for generating a cursor pulse;
b. transition pulse generator means to generate transition pulses at each transition in said series of pulses;
c. means responsive to said cursor pulse and said transition pulse generator to initiate a clock counter at the first transition pulse following said cursor pulse;
d. means to stop said clock counter on the second transition pulse following said cursor pulse; and
e. means to disable said system responsive to said second transition pulse.

* * * * *